United States Patent Office 3,720,662
Patented Mar. 13, 1973

3,720,662
PREPARATION OF STARCH ESTERS
Martin M. Tessler, Edison, and Morton W. Rutenberg, Plainfield, N.J., assignors to National Starch and Chemical Corporation, New York, N.Y.
No Drawing. Filed Sept. 13, 1971, Ser. No. 180,129
Int. Cl. C08b 19/04
U.S. Cl. 260—233.5                                7 Claims

ABSTRACT OF THE DISCLOSURE

Aqueous slurries or dispersions of starch are reacted with mixed carbonic-carboxylic anhydrides of monocarboxylic acids under alkaline conditions to yield ester derivatives of starch. These starch products can also be prepared by a dry reaction process.

---

This invention relates to a novel method for the preparation of starch esters and to the starch products obtained thereby.

The modification of starch by chemical derivatization is well known. An excellent review of the preparation of starch esters up to 1968 may be found in "Starch and its Derivatives," by J. A. Radley, Fourth Edition, published by Chapman and Hall, Ltd.

None of the prior art, however, discloses or suggests our invention, namely the reaction of starch with mixed carbonic carboxylic anhydrides in the presence of water.

The acylation of alcohols with mixed carbonic-carboxylic anhydrides is also known. Such reactions are disclosed in D.S. Tarbell and J. A. Price, J. Org. Chem., 22, 245 (1957); V. E. Reinefield and H.F. Horn, Die Starke, 20, 181 (1968); and J. E. Vilax, French Patent 1,321, 635 (1963). These references all teach the use of anhydrous organic solvents for the reaction.

We have discovered that it is unnecessary to use anhydrous conditions and an organic medium but that water is actually a very good medium for reacting starch with mixed carbonic carboxylic anhydrides.

It is the object of this invention to provide a convenient and economical new method for chemically altering the paste properties of starch by a reaction which proceeds rapidly with granular starch in water slurry at room temperature. Other objects of the invention will be apparent from the following description.

According to this invention starch or a starch derivative is reacted in an aqueous suspension with a mixed anhydride of carbonic acid and a monocarboxylic acid. The reaction may be carried out at temperatures ranging from somewhat below room temperature to somewhat above room temperature and at a pH between 6.5 and 12.5. The reaction may also be carried out in the dry state. By a suitable choice of starting materials, reagents and reaction conditions very useful modified starches may be prepared conveniently and easily as will be explained more fully hereinafter.

The starch base materials which may be used in preparing the starch esters of this invention may be derived from any plant source including corn, potato, sweet potato, wheat, rice, sago, tapioca, waxy maize, sorghum, high amylose corn, or the like. Also included are the conversion products derived from any of these starch bases including, for example, dextrines prepared by the hydrolytic action of acid and/or heat; oxidized starches prepared by treatment with oxidants such as sodium hypochlorite; and fluidity or thin boiling starches prepared by enzyme conversion or by mild acid hydrolysis. Our use of the term "starch base" is thus seen to include any amylaceous substances whether untreated or chemically modified which, however, still retain free hydroxyl groups capable of entering into the acylation reaction of this invention. If the desired product is to be a granular starch then obviously the initial starting material must be in granular form. It is to be noted, however, that the process of our invention may also be carried out employing gelatinized starches, which will result in the production of non-granular starch ester products.

For purposes of this invention the term "mixed carbonic-carboxylic anhydride" means a compound corresponding to the general formula (structure I);

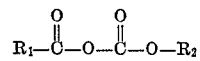

wherein $R_1$ is selected from the group consisting of alkyl, substituted alkyl, unsaturated alkyl, cycloalkyl, aryl, substituted aryl, and aryl-alkyl; $R_2$ is selected from the group consisting of alkyl, aryl, and aryl-alkyl. $R_1$ and $R_2$ may each contain between one and twenty carbon atoms. The above structures include within their definition some compounds which are not as desirable for use as others because of their poor stability and tendency to decompose. For example, the compound wherein $R_1$ is the cyanomethyl radical and $R_2$ is the ethyl radical, prepared from cyanoacetic acid and ethyl chloroformate, will ordinarily decompose almost immediately at room temperature, which makes it undesirable for use in this reaction.

Suitable mixed carbonic-carboxylic anhydrides corresponding to structure I may be prepared using carboxylic acids such as, for example, acetic acid, propionic acid, lauric acid, stearic acid, acrylic acid, crotonic acid, methacrylic acid, benzoic acid, phenylacetic acid, trimethylacetic acid, p-nitrobenzoic acid, 1-naphthoic acid, p-cyanobenzoic acid, p-methoxybenzoic acid, cinnamic acid, 6-bromohexamine acid, 3-chlorobutyric acid, cyclohexylacetic acid, and cyclohexane carboxylic acid.

The preparation of mixed carbonic-carboxylic anhydrides of monocarboxylic acid is well described in the literature and is ordinarily carried out by reacting selected monocarboxylic acids, such as those listed hereinabove, with a chloroformate. A typical procedure for preparing those compounds is that of T. B. Windholz, J. Org. Chem., 25, 1703 (1960).

The novel process of this invention comprises the reacting of a mixed carbonic-carboxylic anhydride of a monocarboxylic acid, such as those described hereinabove, with a starch base which is suspended or dispersed in water. The reaction of the mixed anhydride with the suspended starch is carried out at temperatures ranging from about 40° to 120° F., preferably at 70° to 100° F. The pH of the reaction mixture is ordinarily controlled so as to be above 6.5 but below about 11.0, with the preferred range being about 7.0 to about 9.5. The pH is conveniently controlled by a periodic addition of a dilute aqueous solution of sodium hydroxide, but other common bases, such as calcium or potassium hydroxide, tetramethylammonium hydroxide, and sodium carbonate, may be used with equal success.

In one variation of the described method, the pH of the reaction mixture is not controlled. In this variation an excess of base is added to the system, which results in a pH in the range of 11.0 to 12.5, with the mixed anhydride being subsequently added and the reaction neutralized quickly thereafter. Use of the systems wherein the pH is controlled is preferred, however.

The skilled practitioner will recognize that certain starch esters are readily hydrolyzed at high pH, and therefore must be prepared at a pH at which they are stable.

The amount of mixed anhydride reagent used to react with the starch may vary from about 1% to 100%, based on the dry weight of the starch, depending on such factors as the starch base employed, the degree of substitution which is desired in the end product, and the particular anhydride reagent. The mixed anhydride may be employed either in its undiluted form or as a solution in any inert organic solvent, but preferably in one which is water miscible, for example, tetrahydrofuran, acetone, or p-dioxane.

Reaction time will vary from about 0.25 to 16 hours depending on such factors as the reactivity of the reagent used, the amount of reagent used, the temperature employed, etc. Reaction rates ordinarily decrease with mixed anhydrides of higher molecular weight. Completion of reaction is noted by the absence of pH change in the reaction mixture.

After completion of the reaction, the reaction mixture is preferably acidified to a pH of from about 5.0 to 7.0 using any common acid such as hydrochloric acid, sulfuric acid, acetic acid, etc. The resultant starch product is then recovered by filtration and washed free of residual salts with water and is thereafter dried. If the organic by-products produced during the reaction are water-insoluble, they can be removed by washing with alcohol or other suitable organic solvents. Alternatively, the washed product may be drum dried, or spray dried, or gelatinized and isolated by alcohol precipitation.

If desired, the starch ester products of this invention may also be prepared by means of a dry process. In carrying out a typical dry procedure, the dry starch is first suspended in water and the slurry is adjusted to a pH of about 8.0 to 11.8. The starch is thereafter dried, using any common means chosen by the practitioner. The mixed carbonic-carboxylic anhydride is ordinarily diluted with a large excess of organic solvent such, for example, as acetone, tetrahydrofuran, or p-dioxane, and the solution is then sprayed onto the dry starch base which is thereafter heated (as by placing in an oven) at temperatures ranging from about 80° to 120° F. The reaction period (i.e., the heating time) will vary with such factors as the reactivity of the selected mixed carbonic-carboxylic anhydride which is employed, the selected starch base, etc. Reaction periods ranging from about 30 minutes to 6 hours have been found to be sufficient in most instances, however. At the end of the reaction period the treated starch is allowed to cool. If removal of the salts and organic by-products is desired, the starch is slurried in water. The pH of the slurry is adjusted to from about 5.0 to 7.0 and the starch product is recovered from the slurry by filtration, washed free of residual salts with water and isolated in a manner such as previously described above.

It is also possible to synthesize the mixed carbonic-carboxylic anhydride in aqueous solution and then react it with the starch base in situ, without isolation and purification of the anhydride. This synthesis may be carried out by reacting the selected carboxylic acid with a chloroformate, following the procedure of V. Boellert, G. Fritz, and H. Schnell, German Patent 1,133,727 (1962). The mixed anhydride may be prepared before the starch base is added to the reaction mixture or the starch base may be present in the mixture when the anhydride is synthesized. The reaction efficiency of the reaction of starch with the in situ prepared anhydride is not as great as that of the reaction with isolated and purified anhydride; however, it may be economically advantageous.

It is to be noted that a large number of variations may be effected in reacting starch with the mixed carbonic-carboxylic anhydride in accordance with either the wet or dry reaction procedure described above without materially departing from the general limitations set forth herein.

The resultant starch products of this invention are thus presumed to be stabilized by ester linkages with the general reaction employing a mixed carbonic-carboxylic anhydride of structure I being represented as follows:

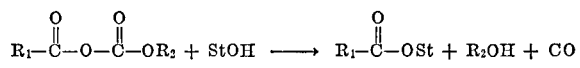

wherein StOH represents the starch molecule and $R_1$ and $R_2$ are as described hereinabove. This is a schematic equation which describes the chemical changes occurring during the reaction. The practitioner will recognize that the starch molecule is a polymer of glucose and contains three free hydroxyl groups per anhydroglucose unit in the polymer. (The non-reducing end glucose units contain four free hydroxyl groups.) each of these hydroxyl groups can react as described in this equation. It is also known that the relative reactivity of each of the hydroxyl groups is not equivalent, some being more reactive than others, and that many hydroxyl groups from the same starch molecule will react to give the products of this invention.

The starch ester products prepared by the process of this invention are characterized by the stability of their dispersions. Thus, the cooked pastes derived from the water dispersible form of these esters display improved clarity and resistance to gelling on cooling. This highly desired property permits the derivatives of this invention to be widely utilized as, for example, in the sizing of paper and textiles, and in foods. Another characteristic of the starch products of this invention is a lowered gelatinization temperature as compared to untreated starch. This is of real importance in many industrial processes (particularly in food manufacture), since it permits operation at lower temperatures.

In the following examples, which illustrate the practice of this invention, all parts given are by weight unless otherwise specified.

EXAMPLE I

This example illustrates the use of various mixed carbonic-carboxylic anhydrides in preparing the starch esters of our invention by means of milk reactions wherein the resulting products display an intact granule structure.

In preparing these derivatives (see Table I), the basic procedure which was followed comprised the suspension of the respective starch bases in 1.25 to 1.50 parts of water per each part of starch whereupon the indicated amounts of the selected mixed carbonic-carboxylic anhydride were introduced. The pH was controlled at the indicated value by periodic addition of 3.0% aqueous sodium hydroxide solution during the entire reaction. The reaction was allowed to proceed, under agitation, at the desired temperature until there was no further change in pH. The resulting starch ester derivatives were then acidified with dilute sulfuric acid, recovered by filtration and subsequently washed with water to remove residual salts.

Table I presents the pertinent data relating to various derivatives which were prepared. In the case of derivative 18, the pH was controlled by addition of solid calcium hydroxide; in the case of derivative 19, by addition of 3.0% aqueous sodium carbonate solution. Each reacted starch was examined for acyl content, calculated from the saponification number.

TABLE I

| Derivative No. | Starch base | Esterification reagent name | Percent on starch | Controlled pH | Temp., °F. | Time, min. | Percent acyl |
|---|---|---|---|---|---|---|---|
| 1 | Corn starch | Ethylcarbonic acrylic anhydride | 5.0 | 8.0 | 73 | 75 | 0.75 |
| 2 | do | Ethylcarbonic methacrylic anhydride | 5.0 | 8.0 | 73 | 40 | 0.97 |
| 3 | Hydrolized corn starch (75 fluidity) | do | 10.0 | 8.0 | 73 | 60 | 2.14 |
| 4 | Corn starch | Benzylcarbonic propionicanhydride | 20.0 | 8.0 | 73 | 180 | 1.16 |
| 5 | do | Ethylcarbonic propionic anhydride | 5.0 | 7.0 | 73 | 60 | 0.45 |
| 6 | do | do | 5.0 | 8.0 | 73 | 70 | 0.67 |
| 7 | do | do | 5.0 | 9.0 | 73 | 70 | 0.86 |
| 8 | do | do | 5.0 | 10.0 | 73 | 70 | 0.60 |
| 9 | do | do | 5.0 | 8.0 | 104 | 65 | 0.71 |
| 10 | do | do | 5.0 | 8.0 | 50 | 60 | 0.77 |
| 11 | Hydrolyzed waxy maize starch (85 fluidity) | do | 7.0 | 8.0 | 73 | 50 | 1.10 |
| 12 | Potato starch | do | 7.0 | 8.0 | 73 | 50 | 1.05 |
| 13 | Tapioca starch inhibited with 0.02% phosphorus oxychloride and hydroxypropylated with 7.5% propylene oxide. | do | 10.0 | 8.0 | 73 | 90 | 1.69 |
| 14 | Corn starch | Ethylcarbonic lauric anhydride | 10.0 | 8.0 | 73 | 480 | 2.35 |
| 15 | do | Ethylcarbonic benzoic anhydride | 7.5 | 8.0 | 73 | 125 | 2.61 |
| 16 | Waxy maize | Ethylcarbonic crotonic anhydride | 10.0 | 8.0 | 73 | 180 | 3.26 |
| 17 | High amylose corn starch (55% amylose by weight). | do | 5.0 | 8.0 | 73 | 120 | 1.99 |
| 18 | Corn starch | Ethylcarbonic propionic anhydride | 10.0 | 8.5 | 73 | 30 | 0.96 |
| 19 | do | do | 10.0 | 8.5 | 73 | 45 | 1.76 |
| 20 | Waxy maize | Ethylcarbonic crotonic anhydride | 2.5 | 8.0 | 73 | 120 | 1.09 |
| 21 | Corn starch | Ethylcarbonic stearic anhydride | 30.0 | 8.0 | 73 | 960 | 5.01 |

EXAMPLE II

This example illustrates the preparation of a starch ester product of this invention by means of a dry reaction.

About 200 parts of waxy maize was pretreated by suspending the starch in 300 parts of water containing 1.6 parts of sodium hydroxide and stirring for a period of 15 minutes. The pH of the suspension was found to be 11.8. The suspension was thereafter filtered and the starch was air dried to have a moisture content of 17%. A solution of 5 parts ethylcarbonic propionic anhydride in about 15 ml. acetone was sprayed onto 50 parts of the previously treated waxy maize. The sprayed starch was then placed in an oven set at a temperature of 45° C. (113° F.) fo ra period of five hours, after which the starch was cooled and poured into 100 parts of water. The pH of this suspension was adjusted to 6.5 with dilute sulfuric acid, and the starch recovered by filtration, washed three times with water and air dried. The starch ester product contained 1.53% propionyl groups.

EXAMPLE III

This example illustrates the preparation of starch ester products of this invention in the presence of excess alkali.

A total of 50 parts corn starch was added to a solution of 15 parts sodium sulfate and 1.5 parts sodium hydroxide in 62.5 parts water. The starch suspension was stirred at room temperature and 3.5 parts of ethylcarbonic benzoic anhydride rapidly added. After stirring for an additional ten minutes, the pH was lowered to 6.5 with 6 N sulfuric acid and the starch isolated by filtration. The starch product was washed three times with water, two times with ethanol, and air dried. The starch product was found to contain 1.68% benzoyl groups.

EXAMPLE IV

This example illustrates the preparation of starch esters by reacting starch with mixed carbonic carboxylic anhydrides prepared in situ.

About 8.6 parts of crotonic acid were added to 125 parts of water and the pH was adjusted to 7.0 with 3.0% aqueous sodium hydroxide. Then 0.2 part of N,N-dimethylcyclohexylamine and 10.8 parts of ethyl chloroformate were added and the pH was maintained between 6.0 and 6.5 by the periodic addition of 3.0% sodium hydroxide. The reaction mixture was stirred vigorously during the entire reaction. After 30 minutes, 100 parts of starch were added and the pH raised to 8.0 with 3.0% sodium hydroxide. The pH was maintained at 8.0 by periodic addition of 3.0% sodium hydroxide during the entire reaction. The reaction was completed after one hour, after which there was no further change in pH. The pH was lowered to 5.0 with 10% hydrochloric acid and the product recovered by filtration. The product was washed three times with water to remove salts and dried. It contained 1.57% crotonyl groups.

The above reaction was repeated except that the starch was added to the water prior to the addition of crotonic acid instead of after the formation of ethylcarbonic crotonic anhydride. The product contained 1.66% crotonyl groups.

The addition of small amounts of sodium persulfate to hot aqueous dispersions of these products resulted in rapid gel formation. This indicates the presence of unsaturated starch crotonate esters which cross-link to form gels.

EXAMPLE V

This example illustrates the preparation of a non-granular starch ester product prepared according to the process of this invention using a previously gelatinized starch base.

About 50 parts of an acid hydrolyzed waxy maize (85 fluidity) was suspended in 200 parts of water. The suspension was heated on a boiling water bath for twenty minutes, then cooled to room temperature and the pH of the thus gelatinized starch adjusted to 8.0 with dilute sodium hydroxide. Thereafter, the cooled starch suspension was stirred and 35.0 parts of ethylcarbonic propionic anhydride was added thereto over a period of four hours. The reaction mixture was then stirred for an additional 16 hours. The pH was maintained at 8.0 during the entire reaction period by periodic addition of 3.0% aqueous sodium hydroxide solution. The starch product was purified by dialysis and recovered by precipitation from ethanol. It contained 10.10% propionyl groups.

In summary, this invention provides a novel and improved process for making starch esters and novel starch ester derivatives obtained thereby.

Variations may be made in materials, proportions, and procedures without departing from the scope of this invention.

We claim:

1. A process for preparing esters of a starch base having free reactive hydroxyl groups comprising the steps of:
(a) reacting said starch base at a temperature of 40° to 120° F. with a mixed carbonic-carboxylic anhydride of a monocarboxylic acid corresponding to

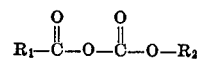

wherein $R_1$ is selected from the group consisting of alkyl, substituted alkyl, unsaturated alkyl, cycloalkyl, aryl, substituted aryl and aryl-alkyl, $R_2$ is selected from the group consisting of alkyl, aryl, and aryl-alkyl; and $R_1$ and $R_2$ each containing from 1 to 20 carbon atoms; said anhydride being substantially stable at room temperature; and (b) isolating the resultant starch derivative.

2. A process according to claim 1 wherein said starch base is reacted with said mixed carbonic-carboxylic anhydride in an aqueous medium at a pH of from about 6.5 to about 12.5.

3. A process according to claim 2, wherein said mixed carbonic-carboxylic anhydride is generated in said aqueous medium and not isolated prior to its reaction with said starch base.

4. A process according to claim 1 wherein the reaction is carried out for a period of from 0.25 to 16 hours.

5. A process according to claim 1 wherein the reaction is carried out in a dry medium at a temperature of 80° to 120° F.

6. A process according to claim 1 wherein said starch base is corn starch.

7. A process according to claim 1 wherein said starch base is waxy maize.

References Cited

UNITED STATES PATENTS

| | | | |
|---|---|---|---|
| 2,914,526 | 11/1959 | Paschall | 260—233.5 |
| 3,100,794 | 8/1963 | Miller | 260—486 |
| 3,271,387 | 9/1966 | Patel et al. | 260—233.5 |
| 3,281,411 | 10/1966 | Lemmerling | 260—233.5 |
| 3,342,806 | 9/1967 | Ray-Chaudhuri | 260—233.5 |
| 3,398,015 | 8/1968 | Buckler et al. | 117—118 |
| 3,513,156 | 5/1970 | Speakman | 260—233.5 |
| 3,549,619 | 12/1970 | Mark et al. | 260—233.5 |
| 3,557,091 | 1/1971 | Martin et al. | 260—233.5 |

OTHER REFERENCES

Whistler et al.: Starch: Chemistry and Technology, vol. I, 1965, pp. 445–449.

DONALD E. CZAJA, Primary Examiner

M. I. MARQUIS, Assistant Examiner

U.S. Cl. X.R.

260—233.3 R